United States Patent [19]
Chevret

[11] 3,829,184
[45] Aug. 13, 1974

[54] AUTOMATIC PLAY TAKE-UP BEARING BUSHES

[75] Inventor: Rémy Chevret, Billancourt, France

[73] Assignees: Regie Nationale Des Usines Renault, Billancourt; Automobiles Peugeot, Paris, both of, France

[22] Filed: Jan. 18, 1973

[21] Appl. No.: 324,595

[30] Foreign Application Priority Data
Jan. 26, 1972  France .............................. 72.02583

[52] U.S. Cl. .......................... 308/237, 16/2, 308/26
[51] Int. Cl. ............................................ F16c 33/04
[58] Field of Search ............. 308/238, 237, 26; 16/2

[56] References Cited
UNITED STATES PATENTS

| | | | |
|---|---|---|---|
| 3,033,624 | 5/1962 | Biesecker | 308/238 |
| 3,186,287 | 6/1965 | Wehlau | 308/238 |
| 3,431,033 | 3/1969 | Dangauthier | 308/26 |
| 3,438,686 | 4/1969 | Stone | 308/238 |

*Primary Examiner*—Manuel A. Antonakas
*Assistant Examiner*—Barry Grossman
*Attorney, Agent, or Firm*—Stevens, Davis, Miller & Mosher

[57] ABSTRACT

This bush-ring adapted to receive a trunnion of a low-load mechanism comprises a resilient portion adapted to undergo a radial distortion as a consequence of the pressure exerted at its end by the trunnion and a distortion-free portion, said resilient portion having a frustoconical section with at least three longitudinal slits which is adapted to be distorted by said trunnion and thus constitute two frustoconical sections having opposite tapers, of which the slip elements having a common base diverge and engage the bearing or trunnion associated therewith, the sections remotest from said stop flange diverging while remaining in bearing contact with said trunnion or bearing.

6 Claims, 7 Drawing Figures

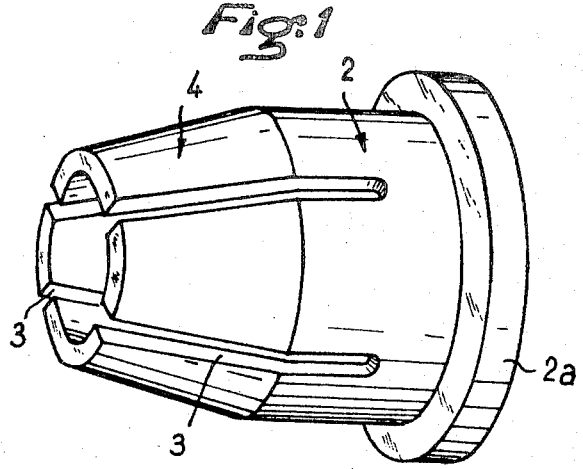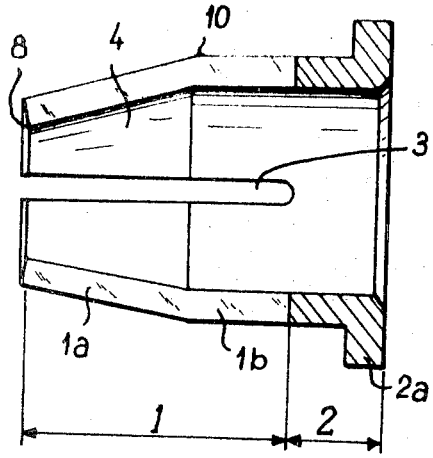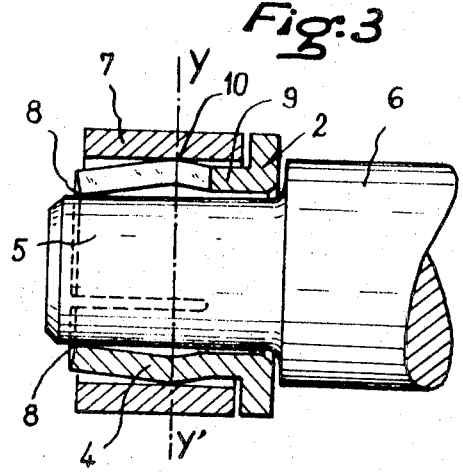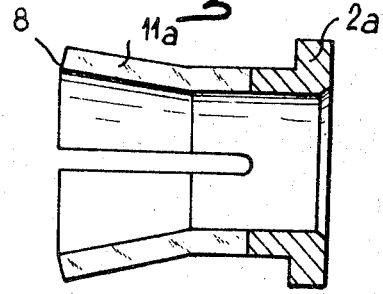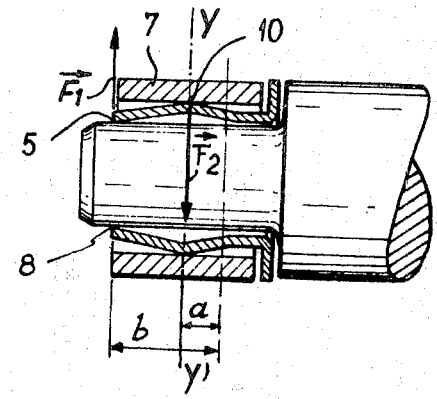

AUTOMATIC PLAY TAKE-UP BEARING BUSHES

The present invention relates in general to bearing bushes and has specific reference to bearing bushes adapted automatically to take up the play developing in the bearings, for general purposes and more particularly for all pivotal connections, linkages and couplings, and all bearings in mechanisms to which only moderate or light loads are applied.

It is known that in all mechanical linkages such as knees or the like a certain play must be preserved between the bushing and the journal, pin, shaft or trunnion fitted in this bearing, or between the bushing and the bearing. Manufacturing tolerances entail sometimes a relatively wide range of plays, whereby some means must be devised for taking up this play.

The known solution to this problem consists either in reducing in the play, obtained by limiting the dimensional tolerances of the component elements of the knee, or reinforcing the journal after the assembling operation in order to obtain a minimum play.

However, these known solutions are attended by the following inconveniences:

a. excessive cost of the assembly, due either to the reinforcing operation to be performed after the assembling, or to the necessarily close tolerances, or to excessively tight fitting of bushings in the bearings;
b. risk of jamming the parts;
c. absence of play take-up, in increased play.

It is therefore the essential object of the present invention to provide a bush-ring or bushing characterised by the automatic taking up of play and which is free of the above-mentioned inconveniences while permitting, by relying on the elasticity of the bush material without exceeding the elastic limit thereof, of eliminating plays and centering the pin, shaft or trunnion in the bush bore.

This bush-ring or bushing, adapted to receive a journal, pin, shaft or trunnion, is clamped in a bearing and provided with an integral stop flange, and characterised essentially in that it comprises at least one resilient portion adapted to undergo a radial distortion under the bearing effort exerted at its end by said pin, journal, shaft or trunnion, and at least one substantially distortion-free portion, said resilient portion comprising at least one frustoconical section in which at least three longitudinal slits are formed, said resilient portion being adapted to be distorted by said pin, journal, shaft or trunnion to provide at least two opposed frustoconical sections of which the split elements having a common base diverge and bear against the bearing or the trunnion, whereas the ends opposite to said flange are caused to diverge while remaining in bearing contact with said trunnion, or said bearing.

Other features will appear as the following description proceeds with reference to the accompanying drawings illustrating diagrammatically by way of example typical forms of embodiment of the invention. In the drawings:

FIG. 1 is a perspective view of the bush-ring according to the invention;

FIG. 2 is an axial longitudinal section of the bush-ring of FIG. 1;

FIG. 3 is a similar sectional view showing the bush-ring distorted as a consequence of the insertion of a trunnion therein;

FIG. 4 is a sectional view of a modified form of embodiment of the bush-ring comprising an inverted end taper;

FIG. 5 is a diagrammatic view of a bush-ring fitted in position, in order to illustrate the stresses involved;

Figure 6:
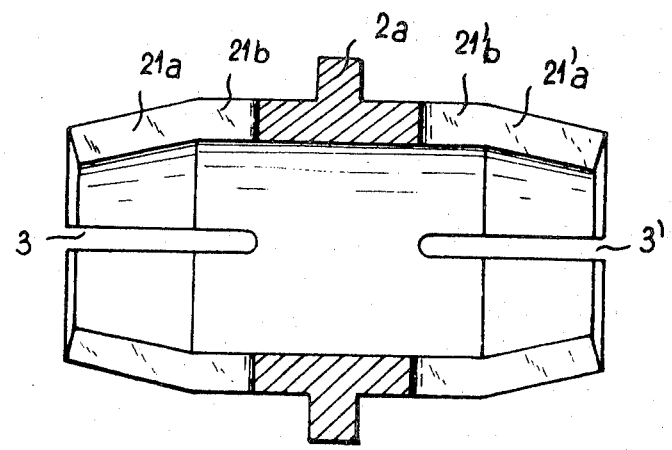
FIG. 6 is an axial section showing another modified form of embodiment of the bush-ring of this invention, which comprises a pair of opposite convergent tapers.

Referring to FIGS. 1 and 2 of the drawings it will be seen that a bush-ring according to this invention comprises essentially two portions, i.e., a first so-called resilient portion 1 consisting of a first frustoconical section 1a of pronounced taper and of a second section 1b either frustoconical but with a very reduced taper angle, or cylindrical, as in the example illustrated, and a second, rigid cylindrical portion 2 constituting the bearing proper and comprising an end flange 2a opposite said first portion 1, whereby the minor base of the frustoconical section is opposite to said flange 2a.

The first portion 1 has formed therethrough at least three longitudinal slits 3 dividing this portion into segments 4 so as to impart a radial elasticity to the bush; in the example illustrated these slits are four in number and disposed symmetrically.

The smallest inner diameter of the frustoconical section 1a should be less than the diameter of the pin, stub, journal, trunnion or shaft to be inserted through the bush-ring. As shown in FIG. 3, the stub, trunnion or pin 5 of a shaft 6 may be fitted into the bush-ring.

When said stub, trunnion or pin is engaged into the bush-ring and assuming that this bush-ring is already fitted in a bearing 7, this introduction of trunnion 5 is attended by the exertion of a radial stress by the journal member 5 against the end points 8 of the frustoconical segments 4, so as to divaricate said points. Thus, the segments 4 may be considered as constituting beams fitted at 9 into the above-defined second portion 2, and are distorted in order to constitute two opposite tapers having a common base 10 lying in a plane Y—Y' substantially perpendicular to the axis of trunnion 5 and containing the base of the frustoconical section 1a having the major taper angle (FIG. 2). The points of segments 4 which lie on said base 10 are thus forced outwards against the bearing 7 so as to develop a radial reaction force thereat.

Referring now to FIG. 5 in which the reference letter $a$ designates the distance from the plane Y—Y' to the fitting portion 9, the letter $b$ designating on the other hand the distance from the end 8 of segments 4 to the aforesaid fitting portion 9, whereas $F_1$ is the radial force exerted by the journal or trunnion 5 against the ends 8 of the tapered segments 4 of the bush-ring, $F_2$ being on the other hand the reaction exerted by the bearing 7 at 10 on said segments, the following equation giving the equality of the moments is obtained:

$$F_1 \cdot b = F_2 \cdot a$$

and therefore $$F_1 = a/b \, F_2$$

and since $a/b < 1$, we have $F_1 < F_2$

The bush-ring distortion will therefore not counteract the journalling of shaft 6. An essential advantage of the above-described bush-rings is that they do not require an accurate machining of the bearing in which they are housed, since they take up plays automatically.

Of course, other shapes may be contemplated for the bush-ring of this invention; thus, as illustrated in FIG. 4, this bush-ring may comprise a frustoconical portion 11a outflared towards its free end 8, the other sections of the device remaining unchanged.

In a modified form of embodiment illustrated in FIG. 6, the bush-ring comprises a pair of opposite tapered portions 21a and 21'a disposed symmetrically on either side of a flange 2a, as well as cylindrical portions 21b and 21'b with, on either side, longitudinal slits 3 and 3'.

Figure 7:
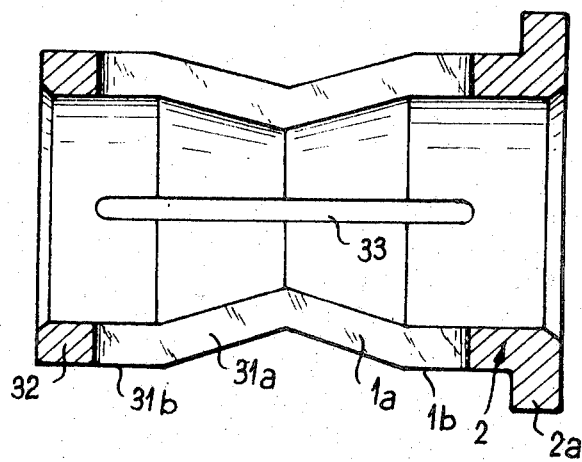
FIG. 7 is an axial section showing a third form of embodiment of a bush-ring according to this invention, which comprises a pair of opposite divergent tapers.

In the double cone form of embodiment illustrated in FIG. 7 there is one portion identical with the left-hand portion of FIG. 6 or the device of FIG. 2, i.e., the portion having an end flange 2a, a substantially cylindrical section 1b and a tapered section 1a having, on the left-hand portion of FIG. 7, an outflared frustoconical portion 31a followed by another cylindrical section 31b terminating with a simple annular portion 32. Longitudinal slits 33 are formed through the adjacent sections 1b, 1a, 31a and 31b.

Of course, other forms of embodiment of the bush-rings of this invention may be contemplated, which in all cases comprise tapered portions having longitudinal slits formed therethrough.

The bush-rings according to this invention are attended by many advantageous features, inter alia:
a. the elimination of static plays;
b. the elimination of noise due to various vibrations;
c. no incidence of the production cost of the knee elements;
d. broader manufacturing tolerances for the journal and bearing;
e. automatic take-up of plays due to wear and/or expansion, and
f. possibility of mounting the device in a coarse cavity (such as die-castings, etc...).

The bush-rings according to this invention are widely applicable in the motor industry, for example in accelerator control linkages, hand-brake transmission knees, bell-crank journals, etc....

Although a few specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. A bush-ring adapted to receive a pin or trunnion of a mechanism subjected to medium or moderate loads and adapted to be force-fitted in a bearing, said bush-ring being of annular cross-section and of radial equal thickness throughout the length thereof but terminating in a radially outwardly extending transverse stop flange of increased radial thickness, and further comprising at least one longitudinal resilient portion adapted to undergo a radial distortion due to the pressure exerted on its end by said pin or trunnion when received in the bush-ring and at least one longitudinal substantially distortion-free portion near to said flange, said longitudinal resilient portion automatically taking up plays and comprising at least one longitudinal frustoconical ring portion in which longitudinal slits are formed which divide the ring portion into split segments, said resilient portion being adapted, when distorted by said pin or trunnion, to constitute at least two frustoconical sections of opposite taper and of which the split elements having a common base are thus caused to diverge and bear against the bearing or pin or trunnion, whereas the portions remote from said flange diverge from one another while bearing against said trunnion or said bearing.

2. A bush-ring according to claim 1, characterised in that the smallest inner diameter of said frustoconical portion is smaller than the diameter of the trunnion or pin to be received in said bush-ring.

3. A bush-ring according to claim 2, characterised in that the minor base of said frustoconical portion lies at the terminal end of the ring which is opposite to said stop flange.

4. A bush-ring according to claim 2, characterised in that the major base of said frustoconical portion lies at the end of said bush-ring which is opposite to said stop flange.

5. A bush-ring according to claim 1, characterised in that it comprises two split frustoconical portions disposed symmetrically in relation to said stop flange, the minor base of each frustoconical portion forming one end of said bush-ring.

6. A bush-ring according to claim 1, characterised in that it comprises two split frustoconical portions having opposed tapers with their minor bases lying in a common transverse plane disposed centrally of said bush-ring, the end opposite to said stop flange consisting of a solid ring portion.

* * * * *